(12) United States Patent
Chiussi et al.

(10) Patent No.: US 6,904,045 B1
(45) Date of Patent: Jun. 7, 2005

(54) METHOD AND APPARATUS FOR GUARANTEEING DATA TRANSFER RATES AND DELAYS IN ASYNCHRONOUS TRANSFER MODE NETWORKS USING PIVOT SESSIONS

(75) Inventors: Fabio M. Chiussi, Long Branch, NJ (US); Andrea Francini, Eatontown, NJ (US); Vijay Sivaraman, Santa Clara, CA (US)

(73) Assignee: Agere Systems Inc., Allentown, PA (US)

( * ) Notice: Subject to any disclaimer, the term of this patent is extended or adjusted under 35 U.S.C. 154(b) by 1064 days.

(21) Appl. No.: 09/587,149

(22) Filed: Jun. 2, 2000

(51) Int. Cl.[7] .............................................. H04L 12/56
(52) U.S. Cl. .................................... 370/412; 370/395.5
(58) Field of Search ............................ 370/395.1, 412, 370/395.3, 395.5, 395.42

(56) References Cited

U.S. PATENT DOCUMENTS

| | | | | |
|---|---|---|---|---|
| 5,517,495 A | * | 5/1996 | Lund et al. | |
| 5,905,730 A | * | 5/1999 | Yang et al. | 370/429 |
| 6,101,193 A | * | 8/2000 | Ohba | 370/429 |
| 6,122,673 A | * | 9/2000 | Basak et al. | 709/238 |
| 6,408,005 B1 | * | 6/2002 | Fan et al. | 370/412 |
| 6,408,006 B1 | * | 6/2002 | Wolff | 370/412 |
| 6,477,168 B1 | * | 11/2002 | Delp et al. | 370/395.4 |
| 6,557,057 B2 | * | 4/2003 | Swaminathan | 710/54 |
| 6,560,195 B1 | * | 5/2003 | Basak et al. | 370/230 |

* cited by examiner

Primary Examiner—Kenneth Vanderpuye

(57) ABSTRACT

An apparatus and method implement a No-Per-Connection-Timestamp Discrete-Rate Scheduler with Pivot Session which does not strictly require the computation and storage of any scheduling-related information per connection, not even a single bit, but only maintains one variable service rate and one timestamp per rate FIFO queue. In a first embodiment, the pivot-session-based scheduler does not make use of per-connection scheduling information, and further embodiments maintain a single scheduling-related bit per connection. The scheduler achieves near-optimal delay bounds, and fairness indices (both SFI and WFI) that are almost identical to those of the discrete-rate scheduler with per-connection timestamps.

25 Claims, 9 Drawing Sheets

METHOD AND APPARATUS FOR GUARANTEEING DATA TRANSFER RATES AND DELAYS IN ASYNCHRONOUS TRANSFER MODE NETWORKS USING PIVOT SESSIONS

CROSS-REFERENCE TO RELATED APPLICATIONS

This application is related to U.S. patent application Ser. No. 60/137,542, filed Jun. 4, 1999. This application is also related to commonly assigned U.S. patent application Ser. No. 09/247,742, filed Feb. 9, 1999; U.S. patent application Ser. No. 09/247,779, filed Feb. 9, 1999; and U.S. patent application Ser. No. 09/432,976, filed Nov. 3, 1999.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

The present invention relates to Asynchronous Transfer Mode (ATM) networks, and in particular to a method and apparatus to compute and sort the timestamps in a system for scheduling packets in Asynchronous Transfer Mode networks for guaranteeing data transfer rates to data sources and data transfer delays from data sources to destinations.

In ATM systems and networks, an important objective is to minimize the complexity involved in the implementation of per-Virtual-Connection (per-VC) schedulers, and to minimize the cost differential of systems including such schedulers with respect to systems using less sophisticated scheduling. More particularly, the minimization of the implementation cost of per-VC schedulers which achieve near-optimal delay and fairness properties in approximating the Generalized Processor Sharing (GPS) policy is a central issue in next-generation ATM switches.

Among GPS-related scheduling disciplines, the class of Packet-by-packet Rate-Proportional Servers (P-RPS) has optimal delay properties. Several well-known scheduling algorithms, such as Packet-by-packet Generalized Processor Sharing (P-GPS), Virtual Clock, Frame-based Fair Queuing (FFQ), and Starting-Potential Fair Queuing (SPFQ), are P-RPS. They differ in the specific function used as system potential, interchangeably referred to as virtual time, which tracks the amount of work that is done by the server and is used to compute, for each cell in the system, a timestamp or finishing potential which specifies when the cell should be transmitted relative to other cells.

While the delay bounds guaranteed by a scheduler are generally accepted as the single measure of interest to characterize its delay properties, two distinct measures of fairness are used.

The Service Fairness Index (SFI), introduced by Golestani as described in S. J. Golestani, "A Self-Clocked Fair Queuing Scheme for Broadband Applications", PROCEEDINGS OF INFOCOM 94, pp. 636–646, April 1994; captures the distance of the scheduler from the ideal fairness of GPS in distributing service to connections that are simultaneously backlogged. The Worst-case Fairness Index (WFI), defined by Bennett and Zhang in J. C. R. Bennett and H. Zhang, "Hierarchical Packet Fair Queuing Algorithms", PROCEEDINGS OF SIGCOMM 96, pp. 143–156, Aug. 1996; measures the maximum amount of time that a backlogged connection may have to wait between two consecutive services. Schedulers with minimal WFI are called worst-case-fair schedulers. The achievement of worst-case-fairness is rather desirable, since the distribution of service to competing connections in a scheduler with small WFI is much less bursty than in a scheduler with large WFI.

With P-RPS schedulers, worst-case fairness is achieved by using the Smallest Eligible Finishing potential First (SEFF) cell-selection policy. With the SEFF policy, the scheduler grants the next service to the cell having the minimum timestamp among those which satisfy the eligibility condition, i.e., those cells whose starting potentials are not greater than the current value of system potential. For each connection, the eligibility condition needs to be verified only for the cell at the head of the corresponding queue, since this is the cell with the minimum starting potential among all cells in that queue. Depending on the specific P-RPS, the resulting scheduler may be work-conserving (P-GPS and SPFQ) or non-work-conserving (Virtual Clock and FFQ).

Any P-RPS scheduler using the SEFF selection policy achieves optimal delay bounds, is worst-case fair, and has an SFI very close to the theoretical lower bound in packet-by-packet servers. Because of their near-optimal delay and fairness properties, worst-case-fair P-RPS schedulers have gained popularity, and considerable attention has been devoted to simplifying their implementation. Four factors contribute to the total implementation cost of a worst-case-fair P-RPS. One factor is the complexity of maintaining the system-potential function, and is scheduler-specific. For a scheduler supporting V connections, this complexity is $O(V)$ in P-GPS, $O(\log V)$ in SPFQ, and $O(1)$ in Virtual Clock and FFQ. The other three contributions, which are common to all worst-case-fair P-RPS, are (i) the complexity of identifying the eligible cells, (ii) the cost of handling and storing the timestamps, and (iii) the complexity of sorting the timestamps of the eligible cells in order to select the one with the minimum timestamp for the next service.

The complexity of implementing the SEFF policy is a considerable burden when the scheduler's implementation is based on conventional priority queues, since a worst-case of $O(V)$ cells may become eligible at the same time. To solve this problem, Bennett et al. have introduced, in J. C. R. Bennett, D. C. Stephens, and H. Zhang, "High Speed, Scalable, and Accurate Implementation of Fair Queuing Algorithms in ATM Networks", PROCEEDINGS OF ICNP 97, pp. 7–14, October 1997; a simplified scheduling structure, referred to as the discrete-rate scheduler, which can be used when the system is only required to support a relatively small discrete set of guaranteed service rates at any time, an assumption that is certainly realistic in most, if not all, ATM switches.

In the discrete-rate scheduler, backlogged connections with the same service rate are grouped together in a rate First-In-First-Out (FIFO) queue, and scheduling is performed only among the connections at the head of each rate FIFO queue. Thus, the number of connections for which the eligibility condition must be checked and the number of timestamps to be sorted at every timeslot is greatly reduced, to be equal to the number of supported rates. In addition, the complexity of implementing the SEFF policy is considerably decreased. In the case of a worst-case-fair P-RPS, this discrete-rate approach only introduces a negligible degradation in delay bounds, and conserves both the minimal WFI and the excellent SFI of the same P-RPS implemented with conventional priority queue. In order to implement a scheduler with near-optimal delay bounds, the discrete-rate approach requires that the scheduler under consideration be worst-case fair. However, the total implementation cost of the resulting discrete-rate scheduler is not only dramatically lower than that of worst-case-fair schedulers implemented with conventional priority queues, but is even competitive with the cost of non-worst-case-fair schedulers implemented with other known techniques. The competitive cost, together with the achievement of worst-case fairness, explains the recent popularity of the discrete-rate approach for the implementation of P-RPS schedulers.

The discrete-rate scheduler described in J. C. R. Bennett, D. C. Stephens, and H. Zhang, "High Speed, Scalable, and Accurate Implementation of Fair Queuing Algorithms in ATM Networks", PROCEEDINGS OF ICNP 97, pp. 7–14, October 1997; although constitutes an important improvement in reducing the implementation complexity of worst-case-fair P-RPS schedulers, still requires computing and storing a timestamp for each connection, which is a significant contribution to the cost of the scheduler. For convenience as described herein, the scheduling architecture presented in J. C. R. Bennett, D. C. Stephens, and H. Zhang, "High Speed, Scalable, and Accurate Implementation of Fair Queuing Algorithms in ATM Networks", PROCEEDINGS OF ICNP 97, pp. 7–14, October 1997; is referred to as the discrete-rate scheduler with per-connection timestamps.

To further reduce implementation complexity, in F. M. Chiussi and A. Francini, "Implementing Fair Queuing in ATM Switches: The Discrete-Rate Approach", PROCEEDINGS OF INFOCOM 98, pp. 272–281, March 1998; a discrete-rate scheduler is presented which does not require the computation and storage of a timestamp per connection and only maintains a single timestamp per rate. This no-per-connection-timestamp scheduler still achieves near-optimal delay bounds and is worst-case fair. However, the price paid for the elimination of the per-connection timestamps is that the SFI is compromised.

Another variation of the discrete-rate scheduler, presented in F. M. Chiussi and A. Francini, "A Low-Cost Architecture for the Implementation of Worst-Case-Fair Schedulers in ATM Switches", PROCEEDINGS OF GLOBECOM 98, November 1998; does not require a whole timestamp per connection, but only uses a single bit per connection, plus one timestamp per rate FIFO queue. The single-bit-timestamp scheduler achieves near-optimal delay bounds, and fairness indices (both SFI and WFI) that are identical to those of the discrete-rate scheduler with per-connection timestamps.

Such discrete-rate schedulers and their implementations are further described in commonly assigned U.S. patent application Ser. No. 09/247,742, filed Feb. 9, 1999; U.S. patent application Ser. No. 09/247,779, filed Feb. 9, 1999; and U.S. patent application Ser. No. 09/432,976, filed Nov. 3, 1999, each of which are incorporated herein by reference.

SUMMARY OF THE INVENTION

It is an object of the present invention to provide a technique to further reduce the implementation complexity of worst-case-fair P-RPS schedulers in ATM systems while retaining near-optimal delay and fairness properties. An apparatus and method implementing a No-Per-Connection-Timestamp Discrete-Rate Scheduler with Pivot Session are described herein which do not strictly require the computation and storage of any scheduling-related information per connection, not even a single bit, but only maintain one variable service rate and one timestamp per rate FIFO queue. In a first embodiment, the implementation of the pivot-session-based scheduler does not make use of per-connection scheduling information, and further embodiments maintain a single scheduling-related bit per connection. The disclosed scheduler achieves near-optimal delay bounds, and fairness indices (both SFI and WFI) that are almost identical to those of the discrete-rate scheduler with per-connection timestamps.

DETAILED DESCRIPTION OF THE INVENTION

The present invention relates to a technique for reducing the implementation complexity of a worst-case-fair GPS-related scheduler in ATM systems.

Referring to FIGS. 1–6B, the apparatus and method of use implement, in one or more embodiments, a No-Per-Connection-Timestamp Discrete-Rate Scheduler with Pivot Session, which arbitrates the distribution of service to competing connections using a special backlogged session, referred to as the pivot session, in each backlogged rate FIFO queue. As used herein, rate FIFO queues are interchangeably referred to as macro-sessions.

In order to overcome the unfairness of the no-per-connection-Timestamp discrete-rate schedulers of the prior art, the scheduler 10 with pivot session maintains variable macro-session rates. An improper updating mechanism for the macro-session rates would easily compromise the delay bounds and fairness indices of the scheduler. The basic condition to avoid such a degradation of performance requires that the virtual timestamp of a backlogged session i; that is, the timestamp of the corresponding macro-session I at the time session i reaches the head of the rate FIFO queue, be sufficiently close to the system potential at the time the session is queued at the tail of the macro-session. In order for the difference between the virtual timestamp and the system potential to be strictly bounded, the service rate of the macro-session must be frozen for a sufficiently long period of time. It is straightforward, at this point, to identify a complete cycle of services within the macro-session as a candidate for the updating period of the macro-session rate: if $B_I(m_k)$ sessions are backlogged in macro-session I at timeslot $m_k$ when $R_I(m_k)=B_I(m_k)\cdot r_I$ is determined, then the next update of $R_I$ occurs at timeslot $m_{k+1}$, just after the last of the $B_I(m_k)$ sessions has been serviced and the timestamp of macro-session I has increased exactly by $1/r_I$. In this way, the virtual timestamps of all the sessions that are backlogged in macro-session I at timeslot $m_k$ are fully defined at timeslot $m_k$, and the differences between the timestamps of all the sessions that become backlogged between $m_k$ and $m_{k+1}$ and the system potential $P(m_k)$ are easy to bound as well.

Using the pivot session to detect the boundaries of service cycles in the respective rate FIFO queues, the no-per-connection-timestamp discrete-rate scheduler 10 not only retains near-optimal delay bounds and WFI, but additionally achieves excellent SFI, due to the continuous adaptation of the service rates guaranteed to the macro-sessions, which avoids unfair redistribution of leftover bandwidth.

Figure 1:
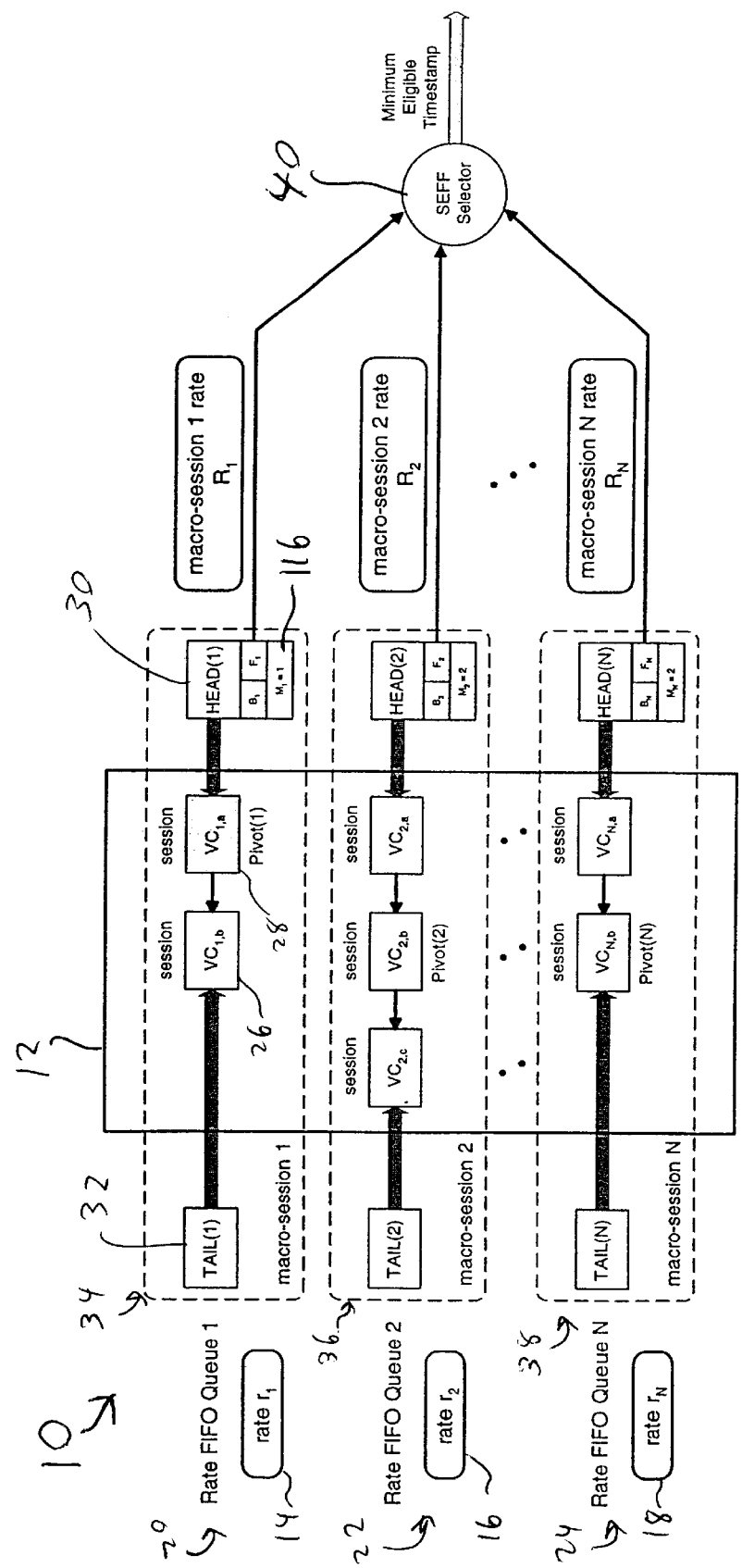
FIG. 1 illustrates a first embodiment of the disclosed scheduler.

In a first embodiment shown in FIG. 1, the no-per-connection-timestamp discrete-rate scheduler 10 using pivot sessions has a server 12 simultaneously supporting only a fixed number N of guaranteed service rates 14–18 at any given time, and connections with the same service rate $r_I$ are queued, when backlogged, in the same rate FIFO queue I of queues 20–24. Each rate FIFO queue I is implemented as a linked list of connections, such as connections 26–28, referred to as virtual connections $VC_{I,a}$, $VC_{I,b}$, ..., $VC_{I,i}$ in FIG. 1, with a pointer HEAD(I) to the first connection in the list and a pointer TAIL(I) to the last connection in the list, such as HEAD(I) 30 and TAIL(I) 32 of the first rate FIFO queue 20 shown in FIG. 1.

When a connection becomes backlogged, it is queued at the tail of the corresponding rate queue. When a rate queue is granted a service, the connection that is currently at its head is de-queued, and if still backlogged, queued back at the tail. In the embodiment of FIG. 1, the scheduler 10 does not use any per-connection scheduling information, but only maintains a timestamp $F_I$, a queue length $B_I$, a variable service rate $R_I$, and a service counter $M_I$, for each rate FIFO queue I.

The scheduler 10 grants service to the macro-sessions 34–38 according to the values of their timestamps. At timeslot m, the scheduler searches for the macro-session timestamp $F_{S(m)}$ which has the minimum value among the timestamps of currently backlogged macro-session, in which a macro-session is backlogged when it has at least one connection queued, and satisfies the eligibility condition for processing by the SEFF selector 40 according to the SEFF cell-selection policy:

$$F_{S(m)} = \min_{1 \le I \le N} \left\{ F_I \text{ such that } F_I \le P(m) + \frac{1}{R_I} \right\}$$

Figure 2A:
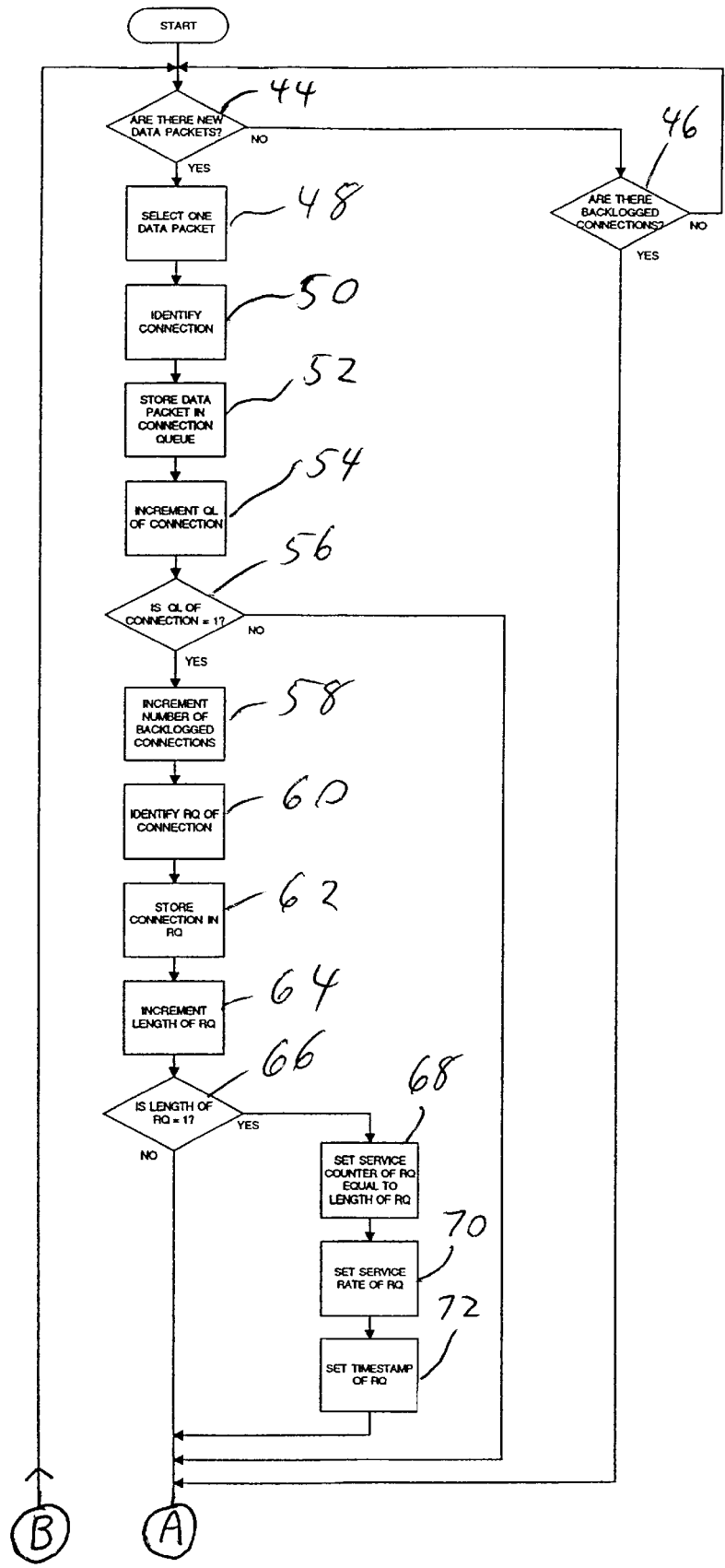
FIGS. 2A–2B illustrate flowcharts of the operation of the first embodiment of FIG. 1.
Figure 2B:
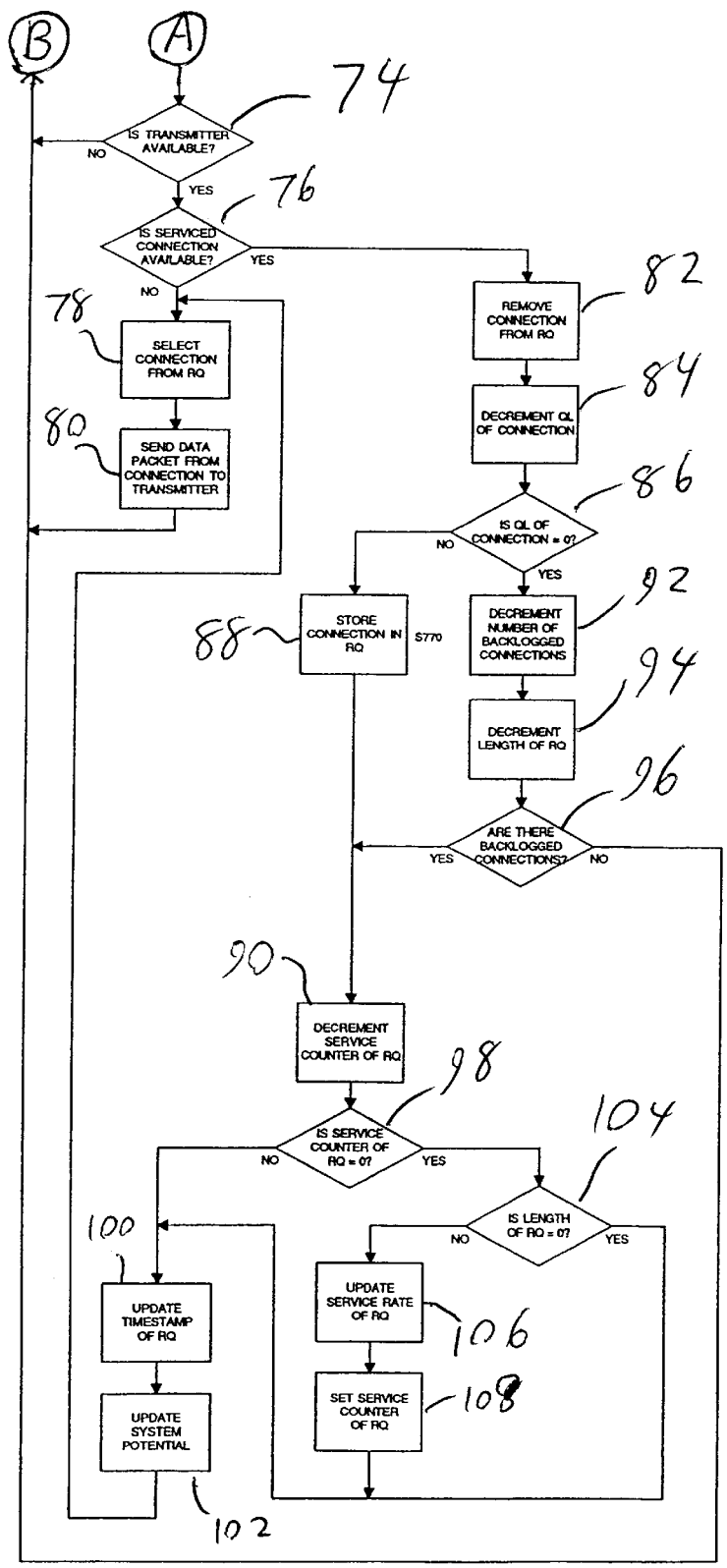

A flowchart describing the operation of the scheduler for maintaining the timestamps and the variable service rates of the macro-sessions is shown in FIGS. 2A–2B.

Generally, according to the disclosed method, at timeslot m, when a new cell of connection i is received, the cell is queued into the corresponding cell queue. If connection i was previously idle, its corresponding rate FIFO queue I is identified. The queue length $B_I$ of the rate queue is incremented and then, if the rate FIFO queue was also idle (in which case session i becomes the pivot session of macro-session I, such as pivot session 28 in FIG. 1), its service rate $R_I$ is set equal to the service rate $r_I$ of the connection, and the macro-session timestamp is computed as follows:

$$F_I = P(m) + \frac{2}{R_I}$$

Then, the scheduler sets the service counter $M_I$ equal to the macro-session queue length $B_I$.

If macro-session I was not idle, connection i is simply appended to the tail of the corresponding rate FIFO queue, and the macro-session queue length is incremented. If, instead, connection i was already backlogged before receiving the new cell, no operation is required on the macro-session variables.

At timeslot n, when a connection i is selected for service, it is de-queued from the corresponding macro-session I and its head-of-the-queue cell is transferred to the transmitter. If connection i becomes idle after being serviced, the scheduler decrements the queue length $B_I$ of macro-session I, otherwise it queues connection i back to the tail of rate queue I. Then, the scheduler decrements the service counter $M_I$ of macro-session I. If the service counter $M_I$ becomes equal to zero (that is, connection i was the pivot of macro-session I) and macro-session I remains backlogged, the scheduler updates the macro-session service rate:

$$R_I = B_I(n) \cdot r_I$$

and sets the service counter in such a way that the connection that is currently at the tail of the rate FIFO queue becomes the new pivot of macro-session I:

$$M_I = B_I(n)$$

Finally, the scheduler updates the timestamp of macro-session I:

$$F_I = \max(P(n), F_I) + \frac{1}{R_I}$$

and the system potential P according to the algorithm adopted for its maintenance.

Referring to FIGS. 2A–2B, in operation, the method determines in step 44 if there are any new data packets. If not, the method then determines in step 46 if there are any backlogged connections. If not, the method loops back to step 44. Otherwise, after step 46, the method performs step 74.

If, in step 44, there are new data packets, the method selects one data packet in step 48, identifies its connection in step 50, stores the data packet in a respective connection queue in step 52, and increments the queue length (QL) of the connection in step 54. The method then determines in step 56 if the queue length of the connection is equal to 1. If not, the method performs step 74. Otherwise, the method proceeds to step 58 to increment the number of backlogged connections, and identifies the rate queue (RQ) of the connection in step 60. The connection is then stored in the identified rate queue in step 62, and the length of the rate queue is incremented in step 64. The method then determines if the length of the rate queue is equal to 1 in step 66. If not, the method proceeds to step 74.

Otherwise, in step 66, if the rate queue length is equal to 1, the method proceeds to step 68 to set the service counter of the rate queue equal to the length of the rate queue. The method then sets the service rate of the rate queue in step 70, sets the timestamp of the rate queue in step 72, and proceeds to step 74 in FIG. 2B.

In step 74, the method determines if the transmitter in front of the output interface of the ATM system is available (that is, if the transmitter is currently not dispatching a cell through the output interface). If the transmitter is not available, the method loops back to step 44. Otherwise, if the transmitter is available, the method proceeds to step 76 to determine if the last serviced connection is available (that is, if the last connection for which a cell was dispatched through the output interface is still waiting for its status to be updated to reflect the just completed transmission). If not, the method then selects a new connection to serve from one of the rate queues in step 78, sends a data packet from the connection to the transmitter in step 80, and loops back to step 44.

If the last serviced connection is available in step 76, the method proceeds to remove the connection from the rate queue in step 82, decrements the queue length of the connection in step 84, and determines in step 86 if the queue length of the connection is equal to zero. If not, the method stores the connection in the rate queue in step 88 and decrements the service counter of the rate queue in step 90. Otherwise, in step 86, if the queue length is equal to zero, the method decrements the number of backlogged connections in step 92, and decrements the length of the rate queue in step 94, and then determines in step 96 if there are any backlogged connections. If so, the method proceeds to step 90; otherwise, the method loops back to step 44.

After performing step 90, the method determines in step 98 if the service counter of the rate queue is equal to zero. If not, the method updates the timestamp of the rate queue in step 100, updates the system potential in step 102, and loops back to step 78.

Otherwise, in step 98, if the service counter is equal to zero, the method determines in step 104 if the length of the rate queue is equal to zero. If so, the method proceeds to step 100. Otherwise, the method updates the service rate of the rate queue in step 106, sets the service counter of the rate queue in step 108, and then proceeds to step 100.

Figure 3:
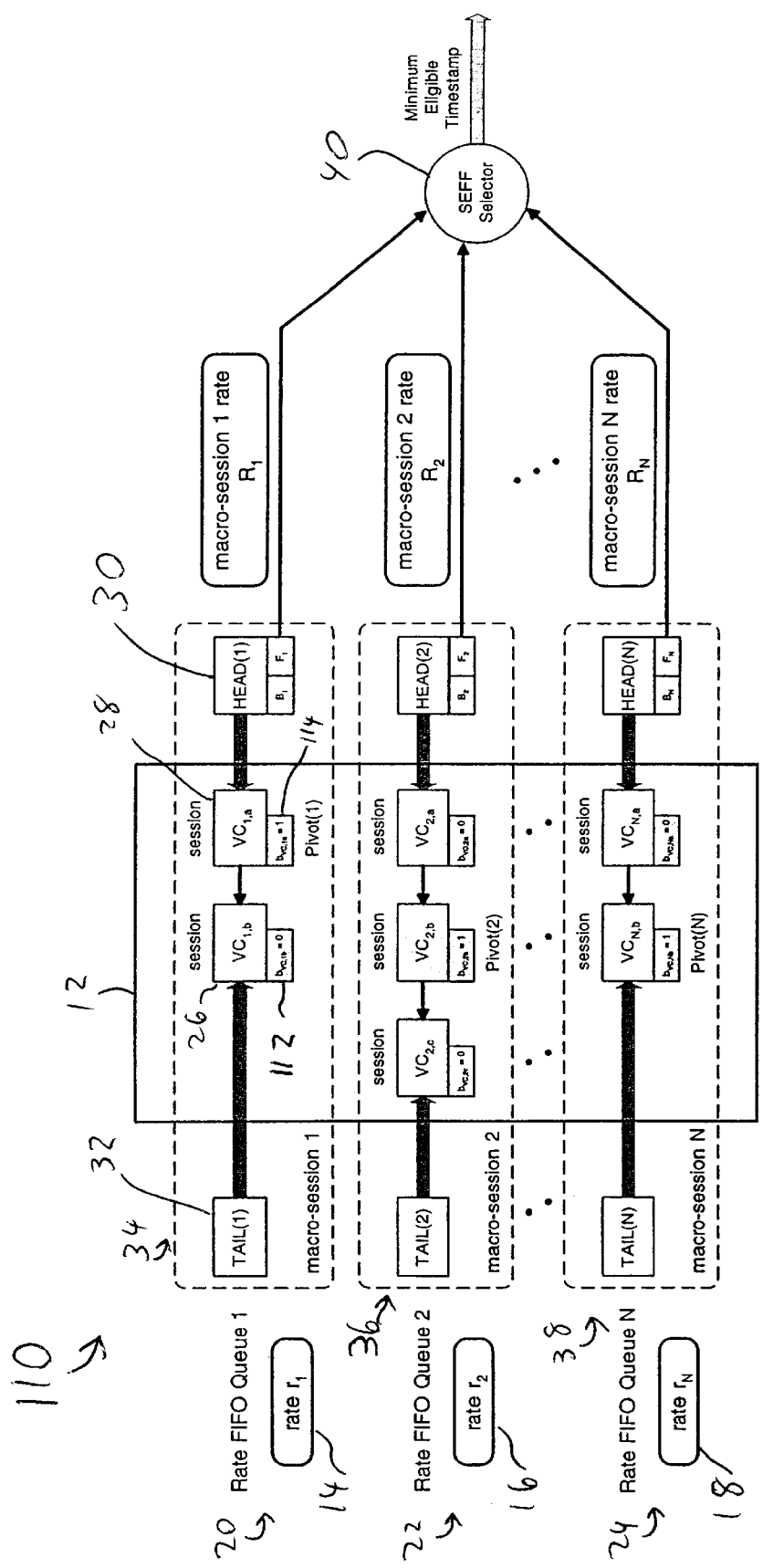
FIG. 3 illustrates a second embodiment of the disclosed scheduler.

In FIG. 3, the basic structure of a second embodiment 110 of the no-per-connection-timestamp discrete-rate scheduler with pivot session is illustrated which makes use of a single bit per connection (the pivot bit). Compared to the structure of the scheduler 10 of FIG. 1, per-connection bits 112, 114 associated with each VC in FIG. 3 replace the per-macro-session service counters 116, shown in FIG. 1. The operation of the scheduler in this second embodiment 110 is shown in the flowchart of FIGS. 4A–4B.

Generally, instead of being implicitly identified by the value of the service counter $M_I$, the pivot session of macro-session I, such as pivot session 28, is explicitly marked with a specific value of the connection bit 114, labeled $b_{VC,I}$, which, for example in FIG. 3, has the value of 1 to mark the pivot session 28.

Figure 4A:
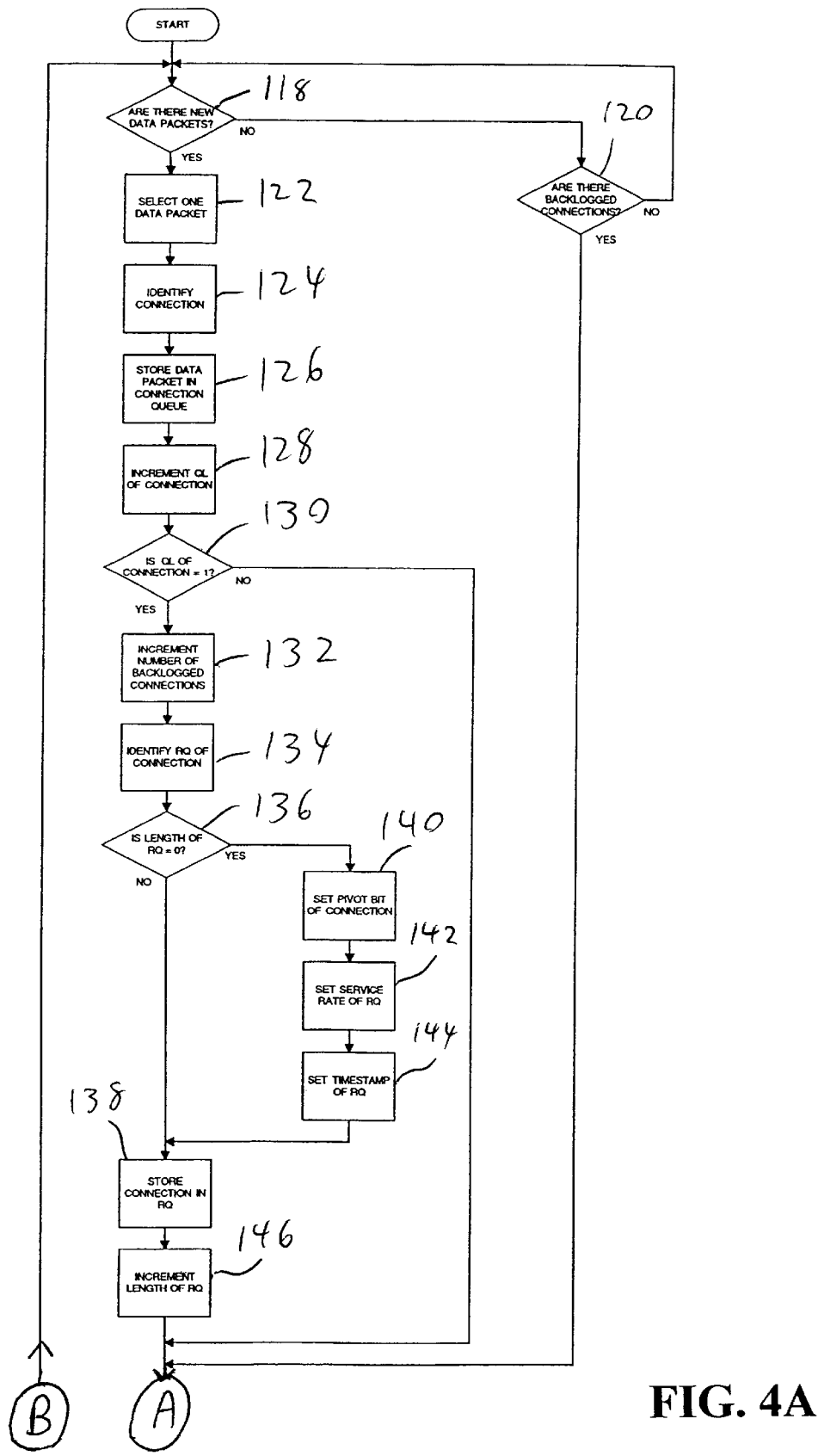
FIGS. 4A–4B illustrate flowcharts of the operation of the second embodiment of FIG. 3.
Figure 4B:
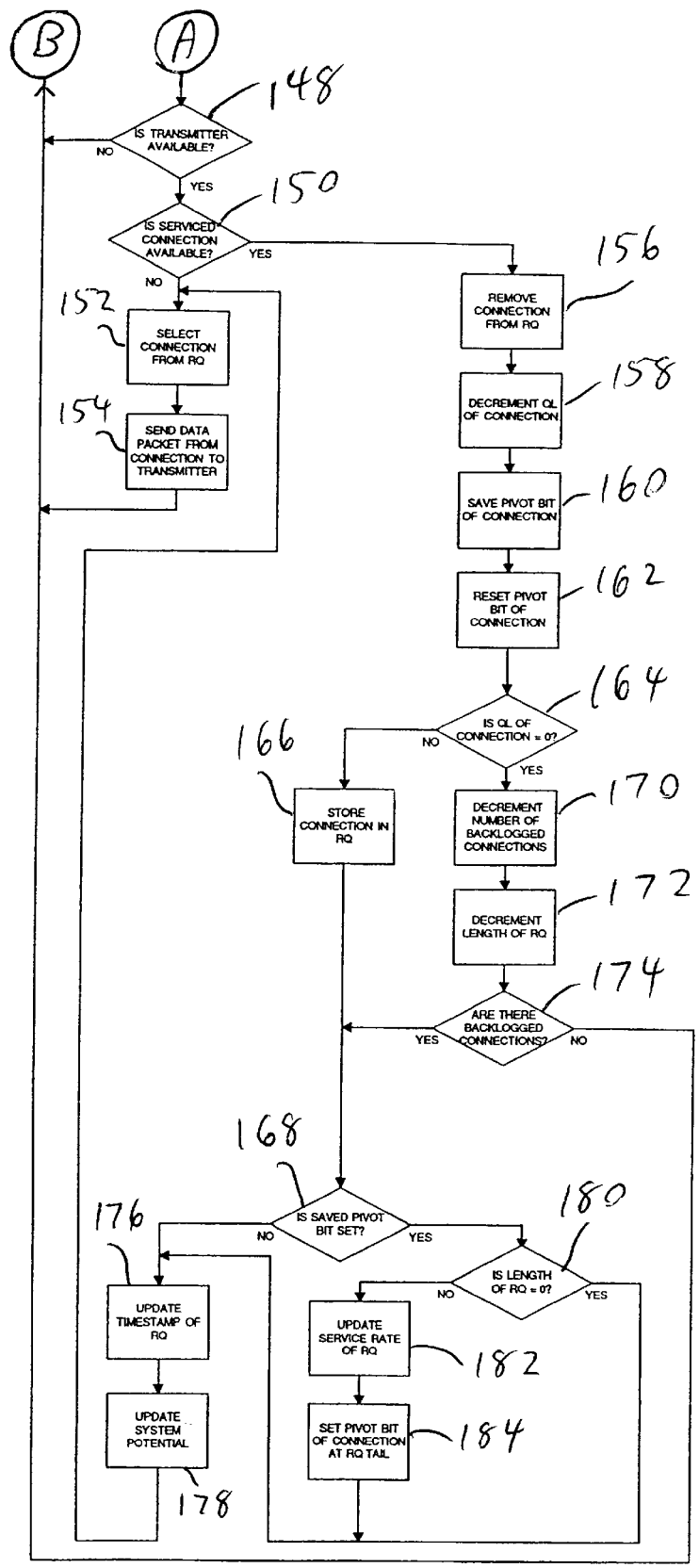

Referring to FIGS. 4A–4B, in operation, the second embodiment of FIG. 3 performs the method by determining in step 118 if there are any new data packets. If not, the method then determines in step 120 if there are any backlogged connections. If not, the method loops back to step 118. Otherwise, after step 120, the method performs step 148.

If, in step 122, there are new data packets available, the method selects one data packet in step 122, identifies its connection in step 124, stores data packets in a respective connection queue in step 126, and increments the queue length (QL) of the connection in step 128. The method then determines in step 130 if the queue length of the connection is equal to 1. If not, the method performs step 148. Otherwise, the method proceeds to step 132 to increment the number of backlogged connections, and identifies the rate queue (RQ) of the connection in step 134.

The method then determines in step 136 if the length of the rate queue is equal to zero. If not, the method performs step 138 to store the connection in the rate queue. Otherwise, after step 136, the method proceeds to step 140 to set the pivot bit of the connection, and then sets the service rate of the rate queue in step 142 and the timestamp of the rate queue in step 144.

After step 144, the connection is stored in the identified rate queue in step 138. After step 138, the length of the rate queue is incremented in step 146, and the method proceeds to step 148.

In step 148, the method determines if the transmitter in front of the output interface of the ATM system is available. If not, the method loops back to step 118. Otherwise, if the transmitter is available, the method proceeds to step 150 to determine if the serviced connection is available. If not, the method then selects a connection to serve from one of the rate queues in step 152, sends the data packet from the connection to the transmitter in step 154, and loops back to step 118.

If the last serviced connection is available in step 150, the method proceeds to remove the connection from the rate queue in step 156, decrements the queue length of the connection in step 158, saves the pivot bit of the connection in step 160, resets the pivot bit of the connection in step 162, and then determines in step 164 if the queue length of the connection is equal to zero. If not, the method stores the connection in the rate queue in step 166 and proceeds to step 168. Otherwise, in step 164, if the queue length is equal to zero, the method decrements the number of backlogged connections in step 170 and the length of the rate queue in step 172, and then determines in step 174 if there are any backlogged connections. If so, the method proceeds to step 168; otherwise, the method loops back to step 118.

At step 168, the method determines if the saved pivot bit is set. If not, the method updates the timestamp of the rate queue in step 176, updates the system potential in step 178, and loops back to step 152.

Otherwise, in step 168, if the saved pivot bit is set, the method determines in step 180 if the length of the rate queue is equal to zero. If so, the method proceeds to step 176. Otherwise, the method updates the service rate of the rate queue in step 182, sets the pivot bit of the connection at the rate queue tail in step 184, and then proceeds to step 176.

Figure 5:
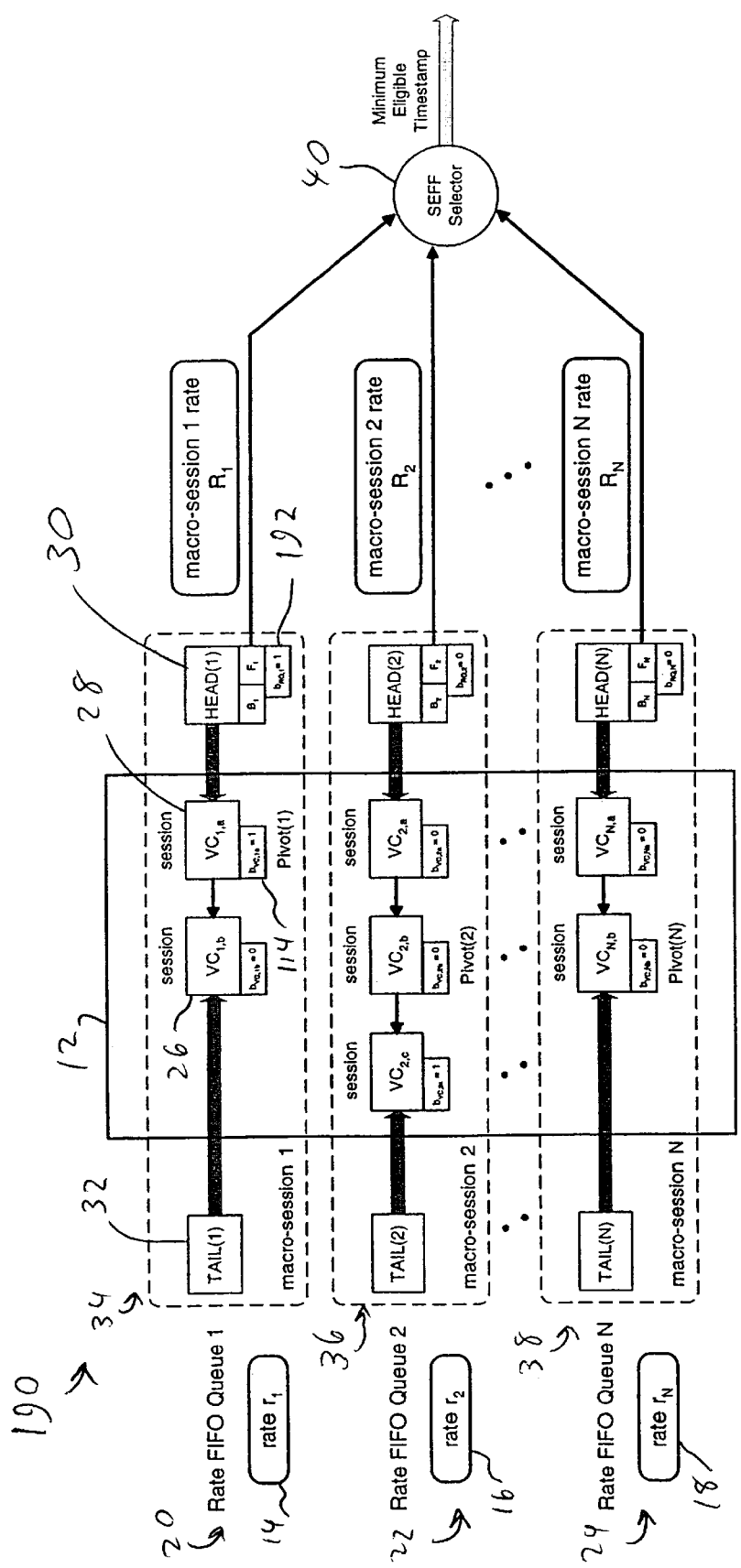
FIG. 5 illustrates a third embodiment of the disclosed scheduler.

FIG. 5 shows the basic structure of a third embodiment 190 of the scheduler, which also makes use of per-connection bits. In this case, similar to the single-bit-timestamp discrete-rate scheduler described in F. M. Chiussi and A. Francini, "A Low-Cost Architecture for the Implementation of Worst-Case-Fair Schedulers in ATM Switches", PROCEEDINGS OF GLOBECOM 98, November 1998; each macro-session I is equipped with a rate-queue bit $b_{RQ,I}$, which may be stored, for example, as a bit 192 associated with the pointer HEAD of each respective rate FIFO queue, such as HEAD(1) 30 of queue 20. According to the flowchart of FIGS. 6A–6B, the pivot session is now identified as the last session i in the queue whose connection bit $b_{VC,i}$ has a value equal to the rate queue bit $b_{RQ,I}$. Compared to the embodiment 110 of FIGS. 3 and 4A–4B, this third embodiment 190 reduces the number of accesses to connection entries that are necessary at every timeslot to mark the pivot session of the rate FIFO queue.

Figure 6A:
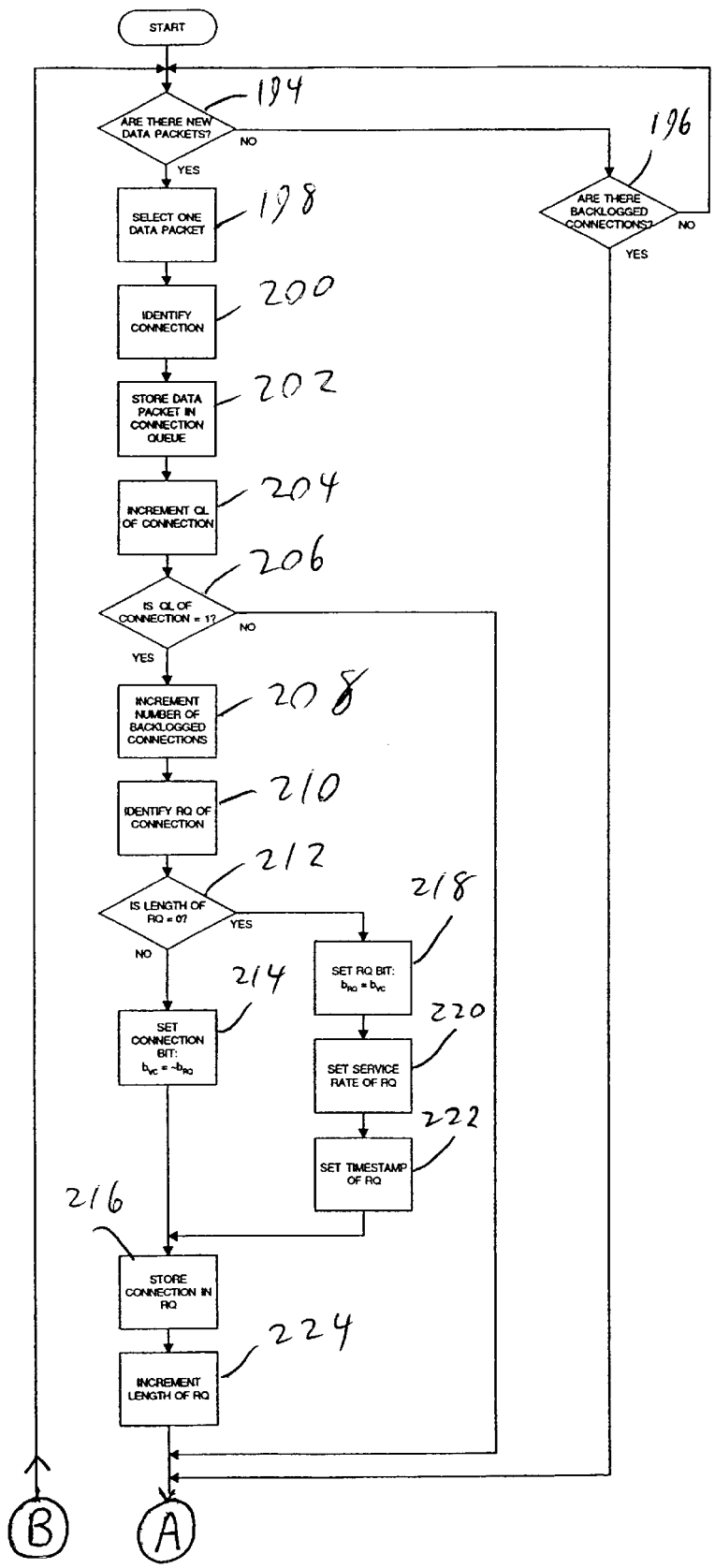
FIGS. 6A–6B illustrate flowcharts of the operation of the third embodiment of FIG. 5.
Figure 6B:
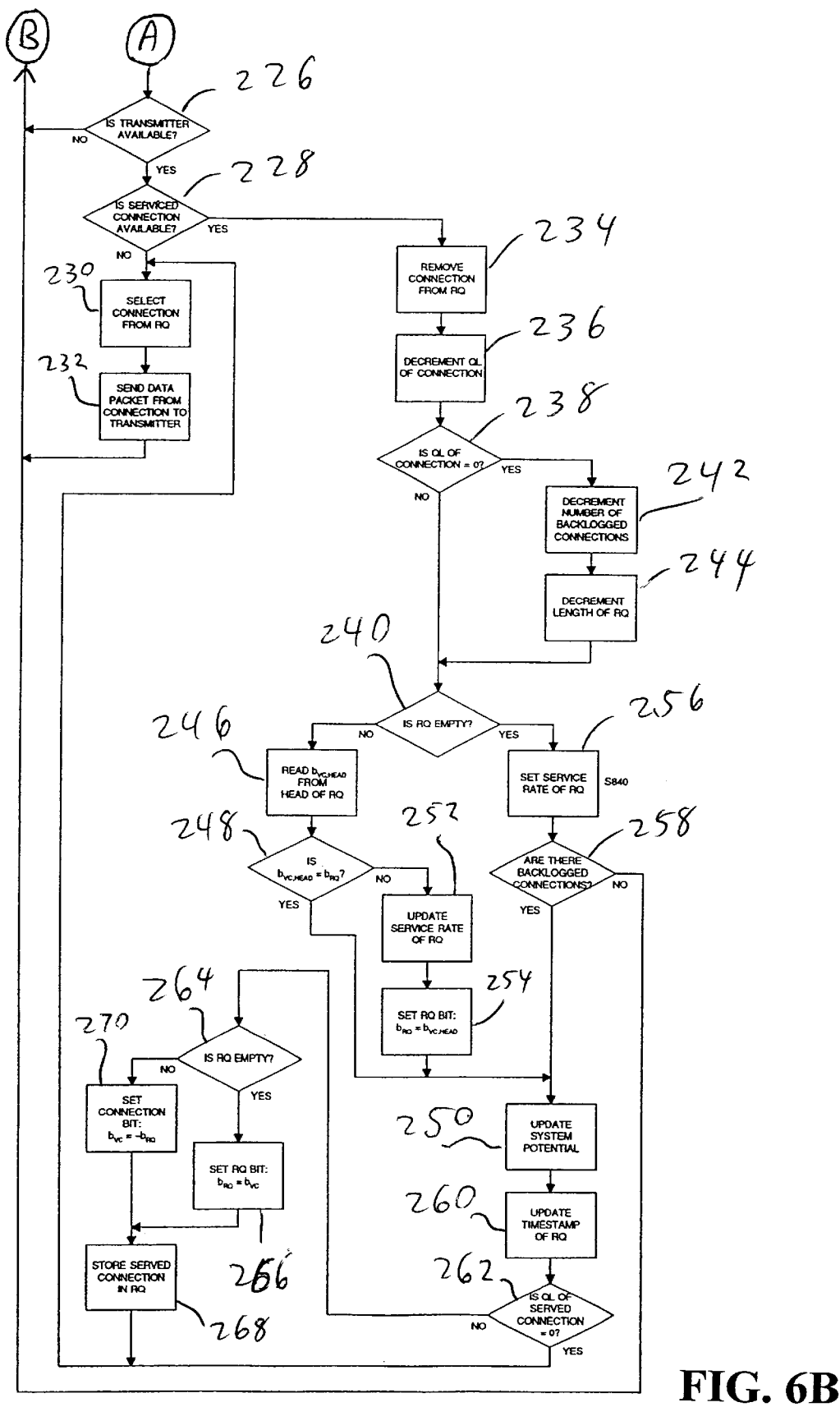

Referring to FIGS. 6A–6B, the third embodiment 190 of FIG. 5 operates according to the method having the steps of determining in step 194 if there are any new data packets. If not, the method then determines in step 196 if there are any backlogged connections. If not, the method loops back to step 194. Otherwise, after step 196, the method performs step 226.

If, in step 194, there are new data packets, the method selects one data packet in step 198, identifies its connection in step 200, stores data packets in a respective connection queue in step 202, and increments the queue length (QL) of the connection in step 204. The method then determines in step 206 if the queue length of the connection is equal to 1. If not, the method performs step 226. Otherwise, the method proceeds to step 228 to increment the number of backlogged connections, and identifies the rate queue (RQ) of the connection in step 210.

The method then determines in step 212 if the length of the rate queue is equal to zero. If not, the method performs step 214 to set the connection bit to be $b_{VC}=\sim b_{RQ}$, where $\sim b_{RQ}$ is the complement of $b_{RQ}$, and proceeds to step 216. Otherwise, after step 212, the method proceeds to step 218 to set the rate queue bit to be $b_{RQ}=b_{VC}$, and then sets the service rate of the rate queue in step 220 and the timestamp of the rate queue in step 222. Step 216 is then performed.

In step 216, the connection is stored in the identified rate queue. After step 216, the length of the rate queue is incremented in step 224, and the method proceeds to step 226.

In step 226, the method determines if the transmitter in front of the output interface of the ATM system is available. If not, the method loops back to step 194. If, instead, the transmitter is available, the method proceeds to step 228 to determine if the serviced connection is available. If not, the method then selects the connection from the rate queue in step 230, sends the data packet from the connection to the transmitter in step 232, and loops back to step 194.

If the serviced connection is available in step 228, the method proceeds to remove the connection from the rate queue in step 234, decrements the queue length of the connection in step 236, and then determines in step 238 if the queue length of the connection is equal to zero. If not, the method proceeds to step 240. Otherwise, in step 238, if the queue length is equal to zero, the method decrements the number of backlogged connections in step 242, and decrements the length of the rate queue in step 244.

Step 240 is then performed, in which the method determines if the rate queue is empty. If not, then the method reads the bit $b_{VC,HEAD}$ from the head of the rate queue in step 246, and the method determines if $b_{VC,HEAD}=b_{RQ}$ in step 248. If so, the method proceeds to step 250 to update the system potential. Otherwise, the method performs step 252 to update the service rate of the rate queue, and then sets the rate queue bit $b_{RQ}=b_{VC,HEAD}$ and proceeds to step 250.

In step 240, if the rate queue is empty, then the method sets the service rate of the rate queue in step 256, and determines in step 258 if there are any backlogged connections. If so, the method proceeds to step 250; otherwise, the method loops back to step 194.

After step 250, the method updates the timestamp of the rate queue in step 260, and determines in step 262 if the queue length of the served connection is equal to zero. If so, the method loops back to step 230; otherwise, the method determines if the rate queue is empty in step 264. If the rate queue is empty, then the method sets the rate queue bit in step 266 to be $b_{RQ}=b_{VC}$, and stores the served connection in the rate queue in step 268. Otherwise, if the rate queue is not empty in step 264, the method sets the connection bit to be $b_{VC}=\sim b_{RQ}$ in step 270, and proceeds to step 268. After step 268 is performed, the method loops back to step 230.

As described herein, the delay bounds and fairness indices (both SFI and WFI) of the no-per-connection-timestamp scheduler with pivot session are almost identical to the ones of the discrete-rate scheduler with per-connection timestamps. More precisely, the worst-case delay experienced by a $(b_i, r_i)$-leaky-bucket-constrained connection i is bounded as:

$$D_i \leq \frac{b_i + 3}{r_i}$$

For the same connection, the Cell Worst-case-Fairness Index (C-WFI) is equal to two cells. The Service Fairness Index, for two connections i and j having reserved service rates $r_i$ and $r_j$, is bounded as:

$$F_{i,j} \leq \max\left(\frac{3}{r_i} + \frac{1}{r_j}, \frac{3}{r_j} + \frac{1}{r_i}\right)$$

The disclosed schedulers and methods have been described by way of the preferred embodiments. However, numerous modifications and substitutions may be made without departing from the spirit of the invention. Accordingly, the invention has been described by way of illustration rather than limitation.

What is claimed is:

1. A method for servicing, at a predetermined service rate, a plurality of queues containing data packets, each of the queues being associated with respective connections, the connections traversing an associated communication switch, each of the connections being allocated a respective data transfer rate, the method comprising the steps of:

identifying for each received data packet, responsive to receiving a plurality of the data packets via a plurality of data links, the respective one of the connections and identifying the associated one of the queues;

storing each of the received data packets in one of the plurality of queues;

associating a queue of connections with each connection wherein an associated queue of each connection has at least one data packet waiting therein, in which the connection is identified as a backlogged connection, the queue of connections-being associated with a respective data transfer rate equal to the data transfer rate associated with each of the backlogged connections in the queue;

appending a connection to the tail of the associated queue of connections when the connection becomes backlogged after a period of time during which no data packets are stored in its associated queue;

associating a timestamp with each of the queues of connections, including generating a new timestamp associated with a queue of connections each time a new backlogged connection reaches the head of the queue of connections, wherein a system potential is used in the generation of the new timestamp;

associating a cumulative service rate with each of the queues of connections, the cumulative service rate being used to generate the respective timestamp associated with each of the queues of connections;

determining one and only one of the connections in each queue to be a pivot session associated with the respective queue;

generating a value for the system potential according to a predetermined function; and selecting one of the timestamps associated with any queues of connections which have at least one backlogged connection waiting for service therein, and identifying the backlogged connection at the head of the queue of connections associated with the selected timestamp as the recipient of the next service, the service including the steps of removing a data packet from the head of the queue associated with the identified backlogged connection using predetermined service criteria associated with the state of the pivot session, transmitting the removed data packet to an output, removing the identified backlogged connection from the head of the queue of connections associated with the selected timestamp, and appending again the identified connection to the tail of the same queue of connections only if the identified connection remains backlogged after the packet has been removed.

2. The method of claim 1, wherein the selection of the timestamp identifying a backlogged connection as the recipient of a service is based on a Smallest-Eligible-Finishing-potential-First (SEFF) timestamp selection policy, wherein a timestamp is selected when its value is minimum among all timestamps being associated with non-empty queues of connections and not exceeding the system potential by more than a fixed amount, the amount being specific of each timestamp.

3. The method of claim 1, further comprising the step of:
updating the cumulative service rate of a queue of connections upon servicing the respective pivot session.

4. The method of claim 1, further comprising the step of:
maintaining a service counter associated with the queue of connections for determining the position of the pivot session within the queue, for performing the servicing of connections.

5. The method of claim 1, further comprising the step of:
maintaining a per-connection bit associated with each connection, with the per-connection bit being used to distinguish the pivot session from the other backlogged sessions in the respective queue of connections, for performing the servicing of connections.

6. The method of claim 1, further comprising the step of:
maintaining a per-connection bit associated with each connection and a per-rate-queue bit associated with each queue of connections, with the relation between the per-connection bits of the backlogged connections in the respective queue and the per-rate-queue bit of said queue being used to distinguish the pivot session from the other backlogged sessions, for performing the servicing of connections.

7. A packet communication system for servicing, at a predetermined service rate, a plurality of queues containing data packets, each of the queues being associated with respective one of a plurality of connections, the connections traversing an associated communication switch, each of the connections being allocated a respective data transfer rate, the packet communication system comprising:

a plurality of queues, with each queue for respectively storing received data packets;

a session controller which identifies for each received data packet, responsive to receiving a plurality of data packets via a plurality of data links, the respective one of the connections and identifying the associated one of the queues;

wherein the session controller associates a queue of connections with each connection wherein an associated queue of each connection has at least one data packet waiting therein, in which the connection is identified as a backlogged connection, the queue of connections being associated with a respective data transfer rate equal to the data transfer rate associated with each of the backlogged connections in the queue;

wherein the session controller appends a connection to the tail of the associated queue of connections when the connection becomes backlogged after a period of time during which no data packets are stored in its associated queue;

wherein the session controller associates a timestamp with each of the queues of connections, including generating a new timestamp associated with a queue of connections each time a new backlogged connection reaches the head of the queue of connections, wherein a system potential is used in the generation of the new timestamp;

wherein the session controller determines one and only one of the connections in each queue to be a pivot session associated with the respective queue;

wherein the session controller associates a cumulative service rate with each of the queues of connections, the cumulative service rate being used to generate the respective timestamp associated with the queue of connections; and wherein the session controller generates a value for the system potential according to a predetermined function; and a selector for selecting one of the timestamps associated with any queues of connections which have at least one backlogged connection waiting for service therein, and identifying the backlogged connection at the head of the queue of connections associated with the selected timestamp as the recipient of the next service, the service including the steps of removing a data packet from the head of the queue associated with the identified backlogged connection using predetermined service criteria associated with the state of the pivot session, transmitting the removed data packet to an output, removing the identified backlogged connection from the head of the queue of connections associated with the selected timestamp, and appending again the identified connection to the tail of the same queue of connections only if the identified connection remains backlogged after the packet has been removed.

8. The packet communication system of claim 7, wherein the selector performs the selection of the timestamp identifying a backlogged connection as the recipient of a service based on a SEFF timestamp selection policy, wherein a timestamp is selected when its value is minimum among all timestamps being associated with non-empty queues of connections and not exceeding the system potential by more than a fixed amount, the amount being specific of each timestamp.

9. The packet communication system of claim 7, further comprising:
means for updating the cumulative service rate of a queue of connections upon servicing the respective pivot session.

10. The packet communication system of claim 7, further comprising:
means for maintaining a service counter associated with the queue of connections for determining the position of the pivot session within the queue, for performing the servicing of connections.

11. The packet communication system of claim 7, further comprising:
means for maintaining a per-connection bit associated with each connection, with the per-connection bit being used to distinguish the pivot session from the other backlogged sessions in the respective queue of connections, for performing the servicing of connections.

12. The packet communication system of claim 7, further comprising:
means for maintaining a per-connection bit associated with each connection and a per-rate-queue bit associated with each queue of connections, with the relation between the per-connection bits of the backlogged connections in the respective queue and the per-ratequeue bit of said queue being used to distinguish the pivot session from the other backlogged sessions, for performing the servicing of connections.

13. A packet communication system for servicing, at a predetermined service rate, a plurality of queues containing data packets, each of the queues being associated with respective one of a plurality of connections, the connections traversing an associated communication switch, each of the connections being allocated a respective data transfer rate, the packet communication system comprising:

a memory having a plurality of queues, with each queue for respectively storing received data packets;

a session controller including:

means for identifying, for each received data packet, responsive to receiving a plurality of the data packets via a plurality of data links, the respective one of the connections and identifying the associated one of the queues;

means for associating a queue of connections with each connection wherein an associated queue of each connection has at least one data packet waiting therein, in which the connection is identified as a backlogged connection, the queue of connections being associated with a respective data transfer rate equal to the data transfer rate associated with the backlogged connection;

means for appending a connection to the tail of the associated queue of connections when the connection becomes backlogged after a period of time during which no data packets are stored in its associated queue;

means for associating a timestamp with each of the queues of connections, including generating a new timestamp associated with a queue of connections each time a new backlogged connection reaches the head of the queue of connections, wherein a system potential is used in the generation of the new timestamp;

means for determining one of the connections in each queue to be a pivot session associated with the respective queue;

means for associating a cumulative service rate with each of the queues of connections, the cumulative service rate being used to generate the respective timestamp associated with each of the queues of connections; and means for generating a value for the system potential according to a predetermined function; and selecting means for selecting one of the timestamps associated with any queues of connections which have at least one backlogged connection waiting for service therein, and identifying the backlogged connection at the head of the queue of connections associated with the selected timestamp as the recipient of the next service, the service including the steps of removing a data packet from the head of the queue associated with the identified backlogged connection using predetermined service criteria associated with the state of the pivot session, transmitting the removed data packet to an output, removing the identified backlogged connection from the head of the queue of connections associated with the selected timestamp, and appending again the identified connection to the tail of the same queue of connections only if the identified connection remains backlogged after the packet has been removed.

14. The packet communication system of claim 13, wherein the selecting means performs the selection of the timestamp identifying a backlogged connection as the recipient of a service based on a Smallest-Eligible-Finishing-potential-First (SEFF) timestamp selection policy, wherein a timestamp is selected when its value is minimum among all timestamps being associated with non-empty queues of connections and not exceeding the system potential by more than a fixed amount, the amount being specific of each timestamp.

15. The packet communication system of claim 13, further comprising:

means for updating the cumulative service rate of a queue of connections upon servicing the respective pivot session.

16. The packet communication system of claim 13, further comprising:

means for maintaining a service counter associated with the queue of connections for determining the position of the pivot session within the queue, for performing the servicing of connections.

17. The packet communication system of claim 13, further comprising:

means for maintaining a per-connection bit associated with each connection, with the per-connection bit being used to distinguish the pivot session from the other backlogged sessions in the respective queue of connections, for performing the servicing of connections.

18. The packet communication system of claim 13, further comprising:

means for maintaining a per-connection bit associated with each connection and a per-rate-queue bit associated with each queue of connections, with the relation between the per-connection bits of the backlogged connections in the respective queue and the per-rate-queue bit of said queue being used to distinguish the pivot session from the other backlogged sessions, for performing the servicing of connections.

19. A method for processing connections in a packet-processing system, the method comprising the steps of:

queuing the connections into a plurality of queues of connections, with each queue having a single service rate associated with every connection in the respective queue;

allocating, for each queue, a single timestamp associated with every connection in the respective queue;

determining one and only one of the connections in each queue to be a pivot session associated with the respective queue; and processing the connections using the timestamps of the queues using predetermined service criteria associated with the state of the pivot session.

20. The method of claim 19, wherein the step of processing the connections includes the step of:

selecting a next connection for service from the plurality of queues of connections based on the single timestamps associated therewith using a Smallest Eligible Finishing potential First (SEFF) selector.

21. The method of claim 20, wherein the SEFF selector is positioned at a root node of the packet-processing system connected to a plurality of heads, with each head being associated with a respective queue.

22. The method of claim 19, further comprising the step of:

updating the cumulative service rate of a queue of connections upon servicing the respective pivot session.

23. The method of claim 19, further comprising the step of:

maintaining a service counter associated with the queue of connections for determining the position of the pivot session within the queue, for performing the servicing of connections.

24. The method of claim 19, further comprising the step of:

maintaining a per-connection bit associated with each connection, with the per-connection bit being used to distinguish the pivot session from the other backlogged sessions in the respective queue of connections, for performing the servicing of connections.

25. The method of claim 19, further comprising the step of:

maintaining a per-connection bit associated with each connection and a per-rate-queue bit associated with each queue of connections, with the relation between the per-connection bits of the backlogged connections in the respective queue and the per-rate-queue bit of said queue being used to distinguish the pivot session from the other backlogged sessions, for performing the servicing of connections.

* * * * *